US012596969B2

(12) United States Patent
Blair

(10) Patent No.: US 12,596,969 B2
(45) Date of Patent: Apr. 7, 2026

(54) CROSS-JURISDICTION WORKLOAD CONTROL SYSTEMS AND METHODS

(71) Applicant: OPEN TEXT SA ULC, Halifax (CA)

(72) Inventor: Steven C. Blair, Marlow (GB)

(73) Assignee: Open Text SA ULC, Halifax (CA)

( * ) Notice: Subject to any disclaimer, the term of this patent is extended or adjusted under 35 U.S.C. 154(b) by 796 days.

(21) Appl. No.: 17/572,746

(22) Filed: Jan. 11, 2022

(65) Prior Publication Data

US 2022/0141291 A1 May 5, 2022

Related U.S. Application Data

(63) Continuation of application No. 16/857,395, filed on Apr. 24, 2020, now Pat. No. 11,228,650, which is a continuation of application No. 15/828,852, filed on Dec. 1, 2017, now Pat. No. 10,659,537.

(60) Provisional application No. 62/431,686, filed on Dec. 8, 2016.

(51) Int. Cl.
| | |
|---|---|
| *G06Q 10/06* | (2023.01) |
| *G06F 9/50* | (2006.01) |
| *H04L 9/40* | (2022.01) |
| *H04L 67/00* | (2022.01) |
| *H04L 67/10* | (2022.01) |
| *H04L 67/125* | (2022.01) |
| *H04W 4/02* | (2018.01) |
| *H04W 12/08* | (2021.01) |
| *H04W 12/63* | (2021.01) |

(52) U.S. Cl.
CPC ........... *G06Q 10/06* (2013.01); *G06F 9/5055* (2013.01); *H04L 63/107* (2013.01); *H04L 67/00* (2013.01); *H04L 67/10* (2013.01);
*H04L 67/125* (2013.01); *H04W 4/02* (2013.01); *H04W 12/08* (2013.01); *H04W 12/63* (2021.01)

(58) Field of Classification Search
None
See application file for complete search history.

(56) References Cited

U.S. PATENT DOCUMENTS

| | | | | |
|---|---|---|---|---|
| 6,272,482 B1 * | 8/2001 | McKee | .................. | G06Q 10/10 706/47 |
| 8,336,079 B2 * | 12/2012 | Budko | .................. | H04L 9/3247 726/1 |

(Continued)

*Primary Examiner* — William L Bashore
*Assistant Examiner* — Koorosh Nehchiri
(74) *Attorney, Agent, or Firm* — Sprinkle IP Law Group

(57) ABSTRACT

At design time, cross-jurisdiction workload controls may be presented by a process platform server to a user (e.g., a workload creator or process builder) who is using the process platform to create or update an application having a workload functionality with zero, one, or more applicable regulation controls. If no regulation control is selected, or if there is no exception provided, the process platform server may operate to block the user from proceeding to complete the workload creation process. The application with the workload thus created/updated is delivered to end user(s). Responsive to a user request to open the application on a client device, a server (the process platform server or an application gateway server) may operate to automatically determine whether a target location associated with the user request is permitted in accordance with a cross-jurisdiction workload control associated the workload defined in the application.

20 Claims, 5 Drawing Sheets

400

(56)     References Cited

U.S. PATENT DOCUMENTS

| | | | | |
|---|---|---|---|---|
| 8,527,143 | B2 * | 9/2013 | Tan .................... | G08G 1/09675 |
| | | | | 340/905 |
| 8,914,789 | B2 * | 12/2014 | Barros .................. | G06F 9/5088 |
| | | | | 717/172 |
| 9,495,649 | B2 * | 11/2016 | Devarakonda .......... | G06F 9/505 |
| 9,600,656 | B1 * | 3/2017 | Wellinghoff ............ | G06F 21/45 |
| 9,734,659 | B2 * | 8/2017 | Ovalle ............... | G07F 17/3237 |
| 11,228,650 | B2 | 1/2022 | Blair | |
| 2003/0085888 | A1 * | 5/2003 | Lafruit .................. | G06F 9/5027 |
| | | | | 345/419 |
| 2016/0080422 | A1 * | 3/2016 | Belgodere ............. | G06N 5/048 |
| | | | | 706/47 |
| 2016/0112453 | A1 * | 4/2016 | Martinez ................ | G06F 9/455 |
| | | | | 726/1 |
| 2016/0358408 | A1 * | 12/2016 | Ovalle .................. | G07F 17/329 |
| 2017/0019396 | A1 * | 1/2017 | Bettenburg .......... | H04L 63/083 |
| 2017/0109967 | A1 * | 4/2017 | Arnone .............. | G07F 17/3211 |

* cited by examiner

CROSS-JURISDICTION WORKLOAD CONTROL SYSTEMS AND METHODS

CROSS REFERENCE TO RELATED APPLICATIONS

This application is a continuation of, and claims a benefit of priority under 35 U.S.C. § 120 from, U.S. patent application Ser. No. 16/857,395, filed Apr. 24, 2020, entitled "SYSTEMS AND METHODS FOR CONTROLLING ACCESS TO APPLICATIONS USING CROSS-JURIS-DICTION WORKLOAD CONTROL," now U.S. Pat. No. 11,228,650, which is a continuation of, and claims a benefit of priority under 35 U.S.C. § 120 from, U.S. patent application Ser. No. 15/828,852, filed Dec. 1, 2017, entitled "CROSS-JURISDICTION WORKLOAD CONTROL SYS-TEMS AND METHODS," now U.S. Pat. No. 10,659,537, which claims a benefit of priority from U.S. Provisional Application No. 62/431,686, filed Dec. 8, 2016, entitled "CROSS-JURISDICTION WORKLOAD CONTROL SYS-TEMS AND METHODS," both of which are fully incor-porated by reference herein for all purposes.

TECHNICAL FIELD

This disclosure relates generally to data processing in a network computing environment. More particularly, this disclosure relates to systems and methods for cross-juris-diction workload controls, useful for integrating processes across functions, systems, machines, and clouds.

BACKGROUND OF THE RELATED ART

Enterprise information management (EIM) refers to a particular field in information technology (IT) for managing enterprise data and content. As organizations and enterprises experience digital disruption and automation of information tasks, they need an IT or EIM-specific platform that can support integration between content and processes to con-nect the right person, system, or thing with the content it needs at the right time. An EIM platform in this disclosure refers to a computing environment which includes hardware and software and which defines a standard around which an EIM system can be developed.

Building and operating an EIM platform can have many challenges. For example, enterprise contents and processes can be structured or unstructured and can come in various types, forms, formats, protocols, etc. Accordingly, an EIM platform needs to support various types of process-related flows of information throughout each organization or enter-prise so as to facilitate seamless human-to-human, human-to-machine, and machine-to-machine interactions and pro-cesses (e.g., repeatable data governance processes that specify business data definitions, quality requirements defi-nitions, policy and standards reviews, issue tracking and resolutions, etc.).

These challenges are not uncommon to EIM systems and there is a continuing need for innovations and improve-ments. Embodiments disclosed herein can address this need and more.

SUMMARY OF THE DISCLOSURE

Today, many organizations and enterprises operate glob-ally. These global entities may seek to enforce, maintain, and control workloads or workflows in their multinational operations. However, because of regulatory, and/or legal controls in a country, or region, certain processes may or may not be locally permissible.

To this end, embodiments disclosed herein can provide a way to block processes and/or alert and advise a user implementing a workload that would cause an enterprise for which the user works legal exposure that may result in severe financial penalties. In this disclosure, "workload" and "workflow" are used interchangeably to refer to a process of performing a series of particular tasks. For example, a workload may define a service or collection or code that can be executed or it can be a characterization of the work that applications perform on an EIM platform.

In some embodiments, a method for cross-jurisdictional workload controls may operate in the context of creating and generating a new workload (e.g., at design time). In some embodiments, cross-jurisdiction workload controls may be part of or otherwise provided to an application having a workload functionality. When a workload creator or process builder is creating a workload in the application, these cross-jurisdiction workload controls can be presented to the workload creator via a user interface of the application.

The method may further include determining what regu-lation controls should be presented and informing the work-load creator accordingly, including requirements such as review(s), approval(s), and/or audit(s) for the regulation controls. There can be zero, one, or more regulation controls applicable to the particular workload being built, any of which may be selected and put in place or otherwise associated with the workload. The method may further include, if no regulation control is selected, or if there is no exception provided, blocking the workload creator from proceeding to complete the workload creation (or generation or update) process.

Once the application is developed or updated, end users may be provided with access to the application with the workload having the cross-jurisdictional control(s) associ-ated therewith. The workload thus created, generated, or updated can be delivered with the application to end user(s).

At runtime and responsive to a request from an end user to open the application (e.g., to complete a task in the workload), a server can automatically obtain a geophysical location indicated in the workload (process), determine whether the geophysical location is permitted in accordance with an appropriate cross-jurisdictional control or controls, and allow the end user to run the application or block the end user from proceeding further, to thereby protect the com-pany, organization, or enterprise, for which the end user works, from legal exposure to severe financial penalties. In some embodiments, the server may generate an audit entry for tracking purposes.

In one embodiment, a system may comprise at least one processor, at least one non-transitory computer-readable storage medium, and stored instructions translatable by the at least one processor to implement a method substantially as described herein. Another embodiment comprises a com-puter program product having at least one non-transitory computer-readable storage medium storing instructions translatable by at least one processor to perform a method substantially as described herein.

Numerous other embodiments are also possible. For example, an application with built-in cross-jurisdictional controls disclosed herein can be any application with a workload function.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of weft-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
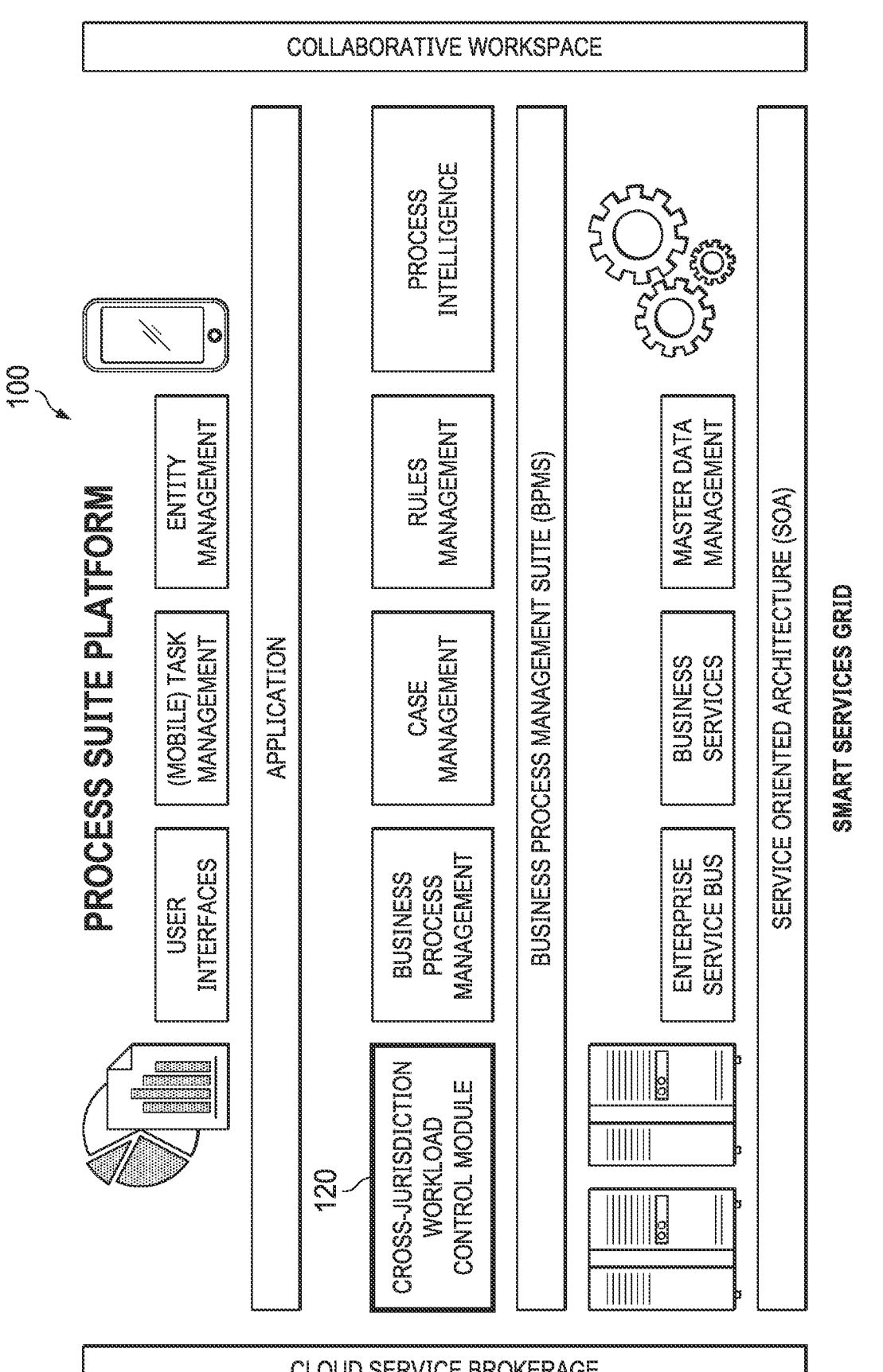
FIG. 1 depicts a diagrammatic representation of a process platform operating in a computer network environment, the process platform having a cross-jurisdiction workload control module, according to some embodiments.

FIG. 1 depicts a diagrammatic representation of an example of integrated computing platform 100 operating in a computer network environment. The Process Suite Platform (available from opentext.com, also referred to herein as a "process platform") is an example of such an integrated computing platform. Flexible and powerful, process platform 100 can digitize, automate, and integrate processes across functions, systems, machines, and clouds.

As illustrated in FIG. 1, process platform 100 is built on Service Oriented Architecture (SOA)—a secure, highly available and stable architecture, and can provide an enterprise with advanced process management (BRIM) and case management capabilities, a streamlined and intuitive application development platform, high-performance enterprise information management (EIM), enterprise resource planning (ERP), and customer experience management (CEM) integration, and robust process-orchestration functionality. SOA, BPM, case management, EIM, ERP, and CEM are known to those skilled in the art and thus are not further described herein. Additionally, process platform 100 can perform in-depth analytics and reporting to create visibility to process performance. When deployed in the Cloud, process platform 100 can be a complete middleware Platform-as-a-Service (PaaS) that combines BPM, integration and application development.

Software vendors can leverage process platform 100 to build Software-as-a-Service (SaaS) applications. Further, software vendors can leverage process platform 100 to offer SaaS applications bunt on process platform 100 and offer BPM PaaS in conjunction with their applications in a cloud computing environment. For example, utilizing BPM PaaS, physical and logical assets of an organization or enterprise can be virtualized into digital representations referred to herein as "managed objects." These managed objects can be modeled, associated, and assigned tasks, and can also produce information, complete work, and exchange information with each other.

In the example of FIG. 1, process platform 100 comprises a new functionality embodied in cross-jurisdiction workload control module 120, according to some embodiments. Gross-jurisdiction workload control module 120 can be invoked when an authorized user working for an organization or enterprise is developing an application with a workload functionality.

As discuss above, in this disclosure, "workload" and "workflow" are used interchangeably to refer to a process of performing a series of particular tasks. A workload may be assigned to a person or a group of people working. These people may be working for the same organization/company/ enterprise or different organizations/companies/enterprises. In some cases, a workload may have a temporal element. For example, a workload may be assigned to a group of people to complete within a six-month timeframe. To this end, a collection of related workloads which allow end users to complete a specific set of business tasks can be defined as a "business service." In this sense, a "workflow" may refer to the process or rate of progress of work done by these end users to complete their workloads.

In some embodiments, a cross-jurisdictional workload function module can be implemented by:

Providing a capability in the product to enable a workflow developer/application developer to select a local or locales (each of which is associated with a particular set of applicable jurisdictional workload controls implemented by an enterprise—such as the workflow developer/application developer's employer's internal legal/ corporate guidance—in line with applicable mandates or legislation, for instance, GDPR, HIPAA, GLB, etc.) of a workflow they are building;

Providing a dialogue and a blocking/unblocking mechanism to the applicable jurisdictional workload controls available in the workflow (e.g., at design time) to ensure that the application enforces an ability for the enterprise to show compliance with the mandate or legislation;

Allowing end users to work with the workflow or application (e.g., at run time) and not cause a legal exposure to their company by violating the mandate or legislation; and Enforcing a uniform enabling or blocking, and logging the activity in a log or file, so a compliance or audit user can verify that the mandate or legislation is being adhered to in the workflow.

In some embodiments, when invoked, cross-jurisdiction workload control module 120 can provide the authorized user (e.g., a workload creator) with options related to target locations and their local controls. Cross-jurisdiction workload control module 120 includes functions that can allow the workload creator to understand, for instance, from a global audit dashboard, locations that may currently expose the company to lead them to reviewing/revising their workloads.

In some embodiments, cross-jurisdiction workload control functions can include, but are not limited to:

Any information contained as a unique data object, regardless of sourced inside the workflow's system, or an external system.

A functional bock that gives a workflow/ application developer the opportunity to easily add a cross-jurisdiction workload control into what they are building.

A high degree in flexibility for selecting the mandate or legislation relevant to the workflow or application being built to allow for compliance.

Exposing/hiding information using roles-based controls so only the correct end-users are able to see reports, dashboards, and content relevant to the system.

Process platform 100 can provide many benefits, including, but are not limited to;

integration of a single, open platform based on a service-oriented architecture;

support of traditional BPM and Dynamic Case Management in a single platform;

enabling true enterprise and information technology collaboration through a single workspace;

support of any kind of workflow, including human, document, or integration-centric ones;

providing master data lifecycle management and synchronization across multiple source systems;

addressing the challenge of orchestrating services between on-premises and the cloud;

using a secure, highly available and stable architecture; and delivering collaboration capabilities and Process Intelligence for advanced reporting and analytics.

In some embodiments, cross-jurisdiction workload control module 120 can interact with process platform 100, acting as a traffic cop to software integrated with process platform 100, to deliver a cross-product workload control mechanism. In some embodiments, cross-jurisdiction workload control module 120 can interact with process platform 100 via an enterprise service bus (ESB).

In some embodiments, process platform 100 can improve performance of networked computer systems in the following areas:

Engagement: Process platform 100 can provide unifying and responsive interfaces that meet the needs of digital customers, employees, and partners, on any device.

Collaboration: With a comprehensive process component library, process platform 100 can power collaborative decision making with shared workspaces, personalized interfaces, and enhanced social capabilities.

Information: Process platform 100 can seamlessly integrate process and information to not only enhance the performance of case management workflows, but also reduce the costs and time to deploy solutions.

Integration: Process platform 100 can provide an integration-centric solution that enables authorized users to easily develop solutions that interface with existing systems and data stores.

Figure 2:
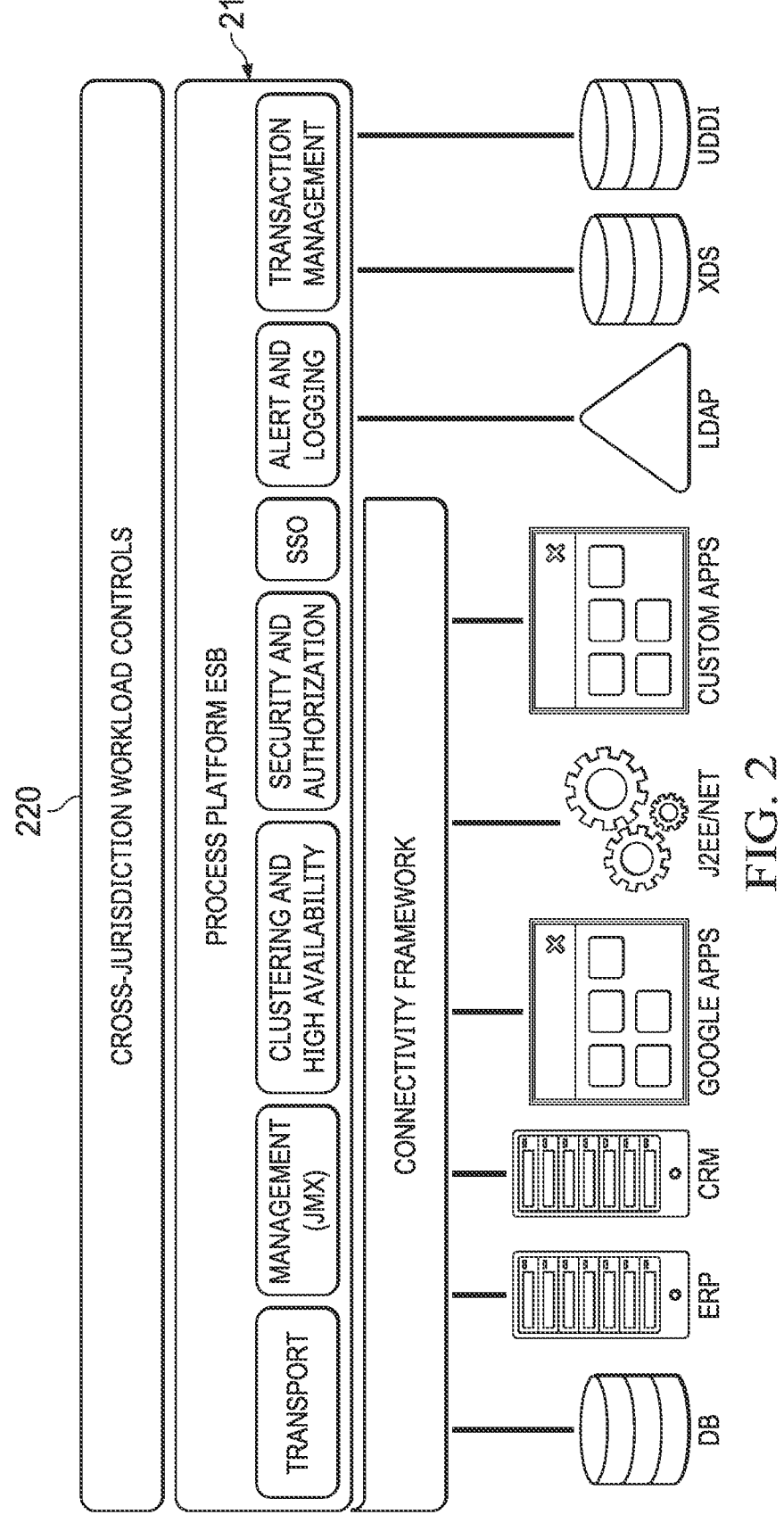
FIG. 2 depicts a diagrammatic representation of cross-jurisdiction workload controls interfacing various distributed services provided by a process platform via an enterprise service bus, according to some embodiments.

FIG. 2 depicts a diagrammatic representation of cross-jurisdiction workload controls 220 interfacing various distributed services provided by a process platform (e.g., process platform 100) via ESB 210, according to some embodiments. As illustrated in FIG. 2, ESB 210 is built on bus architecture and does not have a central hub. This architecture differs from traditional ESB implementations that use a hub-and-spoke architecture, where all back-end systems (spokes) rely on the hub to communicate with each other and any hub failure causes the entire system to fail. Because ESB 210 does not have a central hub, the single point of failure is eliminated. Furthermore, as illustrated in FIG. 2, ESB 210 implements a 'peer-to-peer' communication paradigm, thereby removing a common performance bottleneck. This unique technology enables every service as a loosely coupled, distributed service on a bus, with the associated benefits of granular fail-over and scalability.

Accordingly, any service (a SaaS application) running on ESB 210 can interact with cross-jurisdiction workload controls 220 and cross-jurisdiction workload controls 220 can deliver a cross-product workload control mechanism to any service running on ESB 210, for instance, via a user interface of the service or a global audit dashboard. In some embodiments, cross-jurisdiction workload controls 220 need not be integrated with a process platform and may be modularized. For example, cross-jurisdiction workload controls 220 may be included as part of any application that has a workload utility or function for budding a workload that may expand geographically across jurisdictional boundaries. In some embodiments, cross-jurisdiction workload controls 220 may be integrated with an archive server. Implementing cross-jurisdiction workload controls 220 can advantageously prevent organizations, companies, enterprises, or the likes from breaking international laws.

Figure 3:
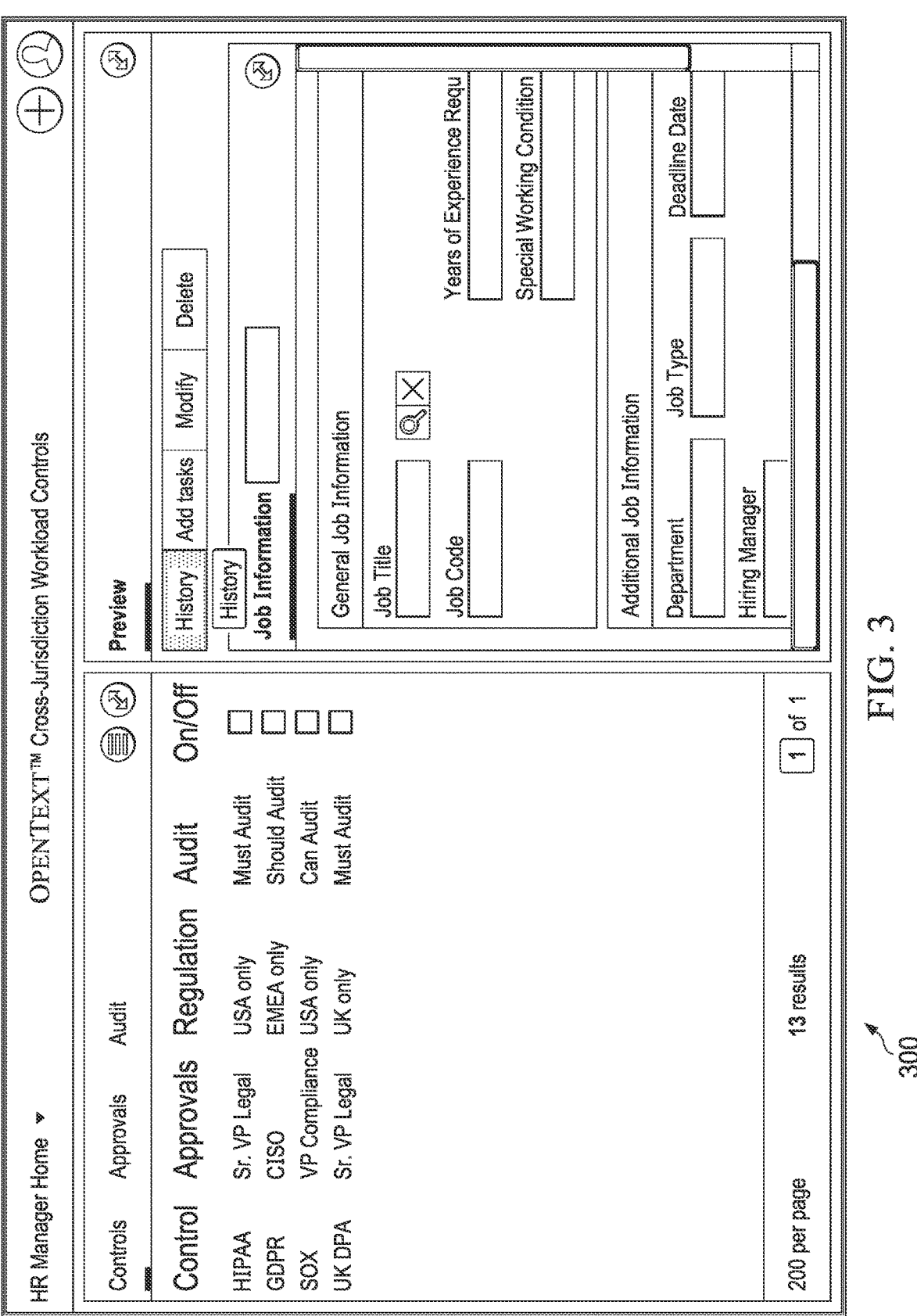
FIG. 3 depicts a diagrammatic representation of a user interface of an application having a workload function with cross-jurisdiction workload controls, according to some embodiments.

FIG. 3 depicts a diagrammatic representation of a user interface (UI) of an application having a workload function with cross-jurisdiction workload controls, according to some embodiments. In this example, UI 300 presents to a workload creator a plurality of target locations (e.g., U.S.A., Europe, the Middle East and Africa (EMEA), United Kingdom (U.K.)) and their local controls (e.g., HIPPA, GDPR, SOX, UK DPA, explained below). For each control, an option is provided via UI 300 for the workload creator to turn the control on or off, along with information on approvals, regulation, and audit requirements.

As discussed above, when a multinational organization, company, enterprise, or the like tries to implement a process, it may inadvertently breach international laws. Today, many jurisdictions have regulatory controls concerning personal data. For example, in the U.S., compliance regulations governing data storage requirements include the Sarbanes Oxley (SOX) Act and the Health Insurance Portability and Accountability Act (HIPPA). SOX defines which business records a company must store and for how long. Under SOX, a company must be able to prove that its data has not been altered from the time it was stored to the time it was retrieved. HIPPA regulates who can view stored data as well as when the data must be destroyed. Complying with data privacy regulations such as HIPPA requires comprehensive access control to the stored data, the ability to provide an audit trail of who has accessed what storage and when, and proper disposal of the data properly once its retention period expires.

In Europe, General Data Protection Regulation (GDPR) was adopted on Apr. 27, 2016 and will enter into application on May 25, 2018. GDPR is a regulation intended to strengthen and unify data protection for individuals within the European Union (EU). The primary objectives of the GDPR are to give citizens back the control of theft personal data and to simplify the regulatory environment for international businesses by unifying the regulation within the EU. GDPR applies if the data controller or processor (organization) or the data subject (person) is based in the EU. GDPR also applies to organizations based outside the European Union if they process personal data of EU residents. GDPR is considered a strict data protection compliance regime with severe penalties of up to 4% of worldwide turnover.

Compliance to all the regulations across jurisdictions can be extremely challenging, not the least of which is because of they all require changing from jurisdiction to jurisdiction in how storage systems are managed. This challenge is even more exacerbated when a process—a series of tasks that are completed in order to accomplish a goal—of a multinational corporation flows across jurisdictions. For example, a person in Company may create a workflow that requires Workload Creator Steve to build an application for End User Pam that has files that move from the EU to the U.S. for Pam's benefit. Suppose Pam receives the files and the files contain individual pieces of End User John's personal data (e.g., John's national insurance number, bank account details, or other privileged information controlled by GDPR across Europe). If John did not opt in to allow his personal data to be in the U.S., then Company actually violates the EU law (GDPR) the minute that John's personal data travels outside of the EU and can face severe financial penalties.

In the example of FIG. 3, the application comes with pre-packaged regulatory controls (e.g., cross-jurisdiction workload controls 220) for HIPAA, GDPR, SOX, and UK DPA. In the process of building a workload via UI 300, a cross-jurisdictional control module (e.g., cross-jurisdictional control module 120) can monitor user actions relative to UI 300 and inform the workload creator or process builder when they are about to include a task that involves moving data from one jurisdiction to another. The cross-jurisdictional control module may prompt the workload creator to check whether a particular regulation or regulations (e.g., HIPAA, GDPR, SOX, etc.) apply and to review (e.g., with legal counsel) the regulation(s) at issue. If any regulation applies, the cross-jurisdictional control module operates to block the workload creator from building the workload that would allow them to move the data from one jurisdiction to another. This action prevents the workload creator from causing/creating legal exposure for the company that they work for.

In some cases, an exception may apply (e.g., per an approval after a review is completed). The system (e.g., process platform 100) may note the exception (in an audit trail) and allow the building to proceed. In some embodiments, the system delivers the built application to end users for use.

In some embodiments, the system can produce auditory rejection tracks. For example, if an end user takes a device from one jurisdiction to another and does not pass the cross-jurisdictional workload control check, a notice or notification is created and logged and/or sent (e.g., to the user and/or management). This can be important for enterprises with device control management.

Figures 4, 5:
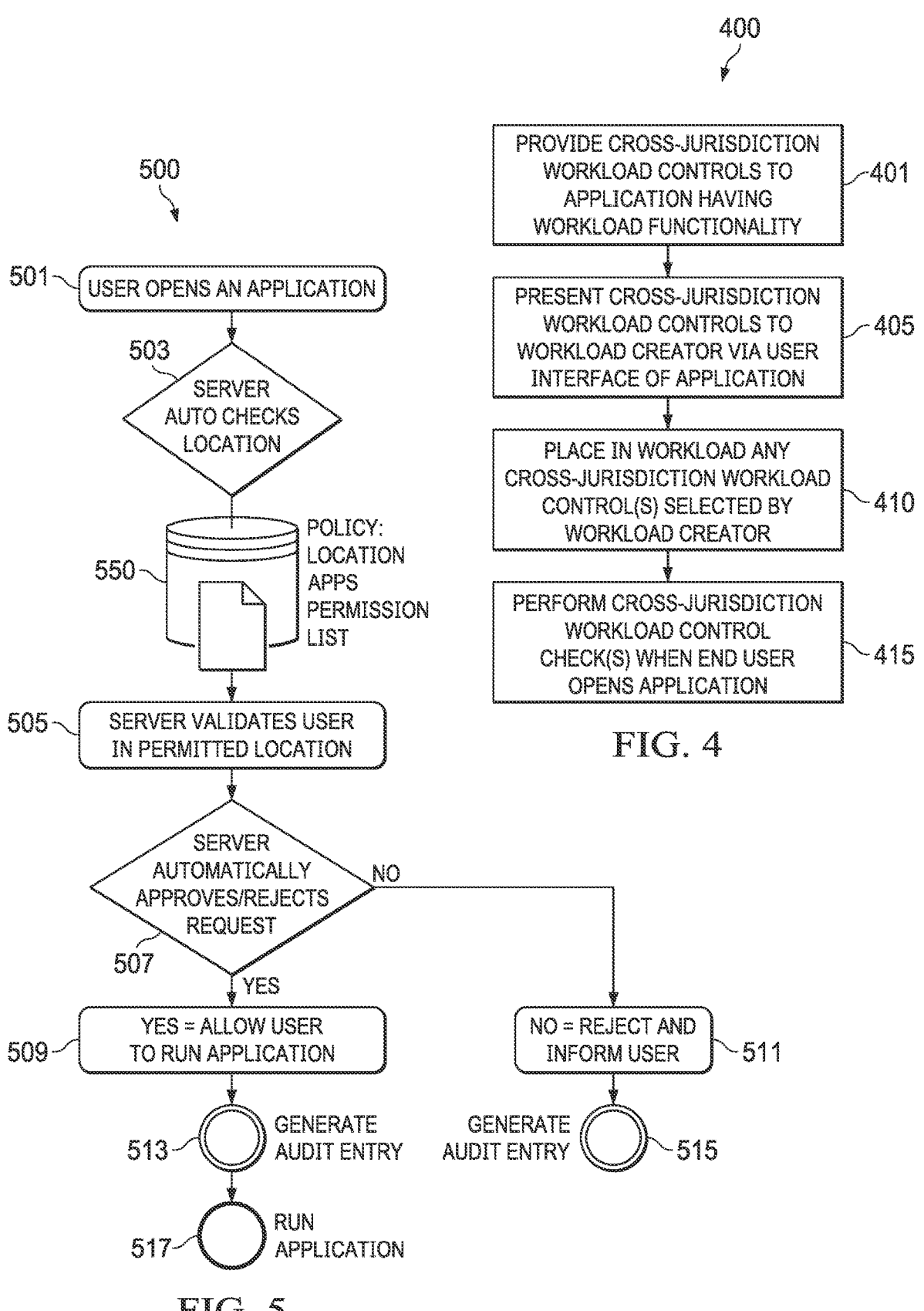
FIG. 4 is a flow chart illustrating an example of a cross-jurisdiction workload control method, according to some embodiments.
FIG. 5 is a flow diagram illustrating an example of an automated software workload with server-side cross-jurisdiction workload control enforcement, according to some embodiments.

In some embodiments, a cross-jurisdiction workload control module can operate in the context of creating and generating a new workload at design time and in the context of monitoring and enforcing cross-jurisdiction workload controls at runtime. Flow chart 400 shown in FIG. 4 illustrates an example of a cross-jurisdiction workload control method, according to some embodiments. In some embodiments, as discussed above, cross-jurisdiction workload controls (e.g., cross-jurisdiction workload controls 220) may be part of or otherwise provided to an application (e.g., a SaaS application running on ESB 210) having workload functionality (401).

When a workload creator or process builder is creating a workload in the application, these cross-jurisdiction workload controls are presented via a user interface (e.g., UI 300) of the application to the workload creator (405). As discussed above, the system may determine what regulation controls should be presented and may inform the workload creator accordingly, as well as other requirements such as review, approval, and/or audit. Alternatively, the system can allow a developer or administrator the ability to point, click, and add the relevant control(s) as needed for a complex workflow/application.

There can be zero, one, or more regulation controls applicable to the particular workload being built, any of which may be selected (by the workload creator, perhaps after review and approval, as shown in UI 300) and placed (by the cross-jurisdiction workload control module) in or otherwise associate with the workload (410). The application with the workload thus created or updated with the cross-jurisdiction workload control(s) is then delivered to end user(s).

If no regulation control is selected, or if there is no exception provided, the system may operate to block the workload creator from proceeding to complete the workload creation process, as discussed above. In some embodiments, as explained below, enforcement of cross-jurisdiction workload control(s) may be performed when an end user opens the application to perform the workload (415).

In some embodiments, the server can be an application gateway server described in U.S. Patent Application Publication No. 2015/0088934, entitled "HOSTED APPLICATION GATEWAY ARCHITECTURE WITH MULTI-LEVEL SECURITY POLICY AND RULE PROMULGATIONS," which is incorporated by reference herein, and the application can be a managed container or client software of the application gateway server. In some embodiments, when an end user opens an application (e.g., a workflow application), in real time, a process platform server gets a HTTP GET request, HTTP PUT request, HTTP READ request, or HTTP WRITE request and from that request, the end user will be allowed or not allowed to invoke methods that would run on the server, unless the client device is running a browser with a special add-on from an application gateway server for their client where everything the user does is via the web browser experience (because the process platform does not have a client app).

FIG. 5 is a flow diagram illustrating an example of an automated software workload 500 with server-side cross-jurisdiction workload control enforcement. In the example of FIG. 5, an end user may access a process platform (e.g., process platform 100) from a client device (e.g., user computer 612) communicatively connected to a server machine (e.g., server computer 616) on the process platform. The user may wish to open an application running on the process platform (501). The request from the client device may include geographical information such as a target location (e.g., the request is to use the application to move a the from a source location in the EU to a target location in the U.S. where the client device is located). The request from the client device to open the application on the client device may trigger the server to automatically check to see if the target location is permitted (503), in accordance with the cross-jurisdiction workload control associated with workload 500. In some cases, data store 550 accessible by the server may store, for each entity that utilizes the process platform, a list of locations permitted per their policy per each application running on the process platform. The server may determine whether the user is in a permitted location (505) and make an automatic determination (507) as to whether to approve the request and allow the user to proceed (509) or to reject the request and deny the user access to the application (511). The server may generate an audit entry to log the approval (513) or the rejection (515). If approved, the application is delivered to the client device (517).

In this way, embodiments can stop an enterprise from budding and implementing a workload that may break any one of the more than 160 data compliance laws around the world. Embodiments can detect an end user's location in the workload based on network connectivity and determine whether that user can run a workload (e.g., which server the end user would use). As described above, if the user is to complete a workload, which requires moving a file from one jurisdiction to another, the user cannot fake this task (or the workload could not be completed). In some embodiments, the system may leverage geophysical information provided by network-enabled devices (e.g., using the Transmission Control Protocol/Internet Protocol (TCP/IP) addresses, time zone information, geocodes, etc.) and/or combine with device-level access control lists (ACLS) to further scrutinize the user's location. Notice that the cross-jurisdiction workload control module does not have its own user interface and provides cross-jurisdiction workload controls via user interface through an application for which a workload is being built.

In a highly mobile computing environment, the process platform (e.g., process platform 100) can work together with the application gateway server described in the above-referenced U.S. Patent Application Publication No. 2015/0088934, entitled "HOSTED APPLICATION GATEWAY ARCHITECTURE WITH MULTI-LEVEL SECURITY POLICY AND RULE PROMULGATIONS," to provide multi-jurisdictional workload control(s). For example, with the cross-jurisdiction workload control module, the process platform can communicate with the application gateway server to inform the application gateway server that, while End User Pam is in a particular location, she cannot receive files from Steve in England. The gateway servers of the process platform and the application gateway server can block End User Pam from even opening the application, as described above. If Workload Creator Steve is in the U.S. and builds the workload via the process platform, there would be a tick box inside of the managed container (or client software) of the application gateway that allows Workload Creator Steve to indicate whether or not to enforce geophysical location control.

Another option is to detect geophysical location at the device. If End User Pam is on a mobile device (with GPS enabled), it can pick up geophysical location information and send that to the application gateway server. The application gateway server can pick up the location information and determine whether End User Pam is permitted to access the workload. On a laptop computer or any mobile computing device, the backend server (on the process platform) can depend on the nearest location of a server to provide the location information. Alternatively, the process platform server could have a whitelist and a blacklist of IP networks. In this way, if an end user moves from a private address (e.g., on a company network) to a public address (e.g., in a coffee shop), the process platform server can detect this change. The system could enforce IP address restrictions if needed.

Typically, a user of the process platform implementing a workload in an application will know whether or not multijurisdiction control is needed. For instance, to build a workflow for insurance adjusters, the workflow builder would know such a workflow likely involves an insurance adjuster inspecting cars in the field, take pictures with their mobile devices (e.g., cameras, tablets, smart phones, etc.), create an insurance claim on the spot, and the pictures/file to the corporate office where the insurance claim is to be processed. Suppose an adjuster took off to Japan and start sending files back to the U.S. The process platform server can block (perform workload enforcement) and notify that adjuster that she is in a location that is not supported and, unless the adjuster has exception(s), she cannot send files through this workload.

Today's technology allows companies, organizations, enterprises, or the likes to (willingly or unwillingly) expose themselves to legal matters. On the one hand, embodiments disclosed herein can advantageously block them from doing certain activities across borders. On the other hand, embodiments disclosed herein can selectively target (when a workload is built) a user, a group of users, or servers for anything they do that have to be compliant with data regulations and laws around the world. For example, in creating a workload for processing medical records from point A to point B, the system may operate to check whether the workload involves cross a geophysical boundary. If so, the multijurisdictional workload controls may be turned on for those involved in the workload. All these people can have this type of checks enforced (because they are likely to cross borders in the course of doing their jobs). Some workloads may not have multijurisdictional workload control checks against end users (e.g., for an IT group). As another example, suppose a company with 8000 employees sells products that could be purchased using credit cards and has some servers and 1000 employees running a workload on the Internet that would be under the PCI (Payment Card Industry) data security laws. So, when multijurisdictional workload control checks are applied, the workload checks will be running against those 1000 employees but not the other 7000 employees.

Figure 6:
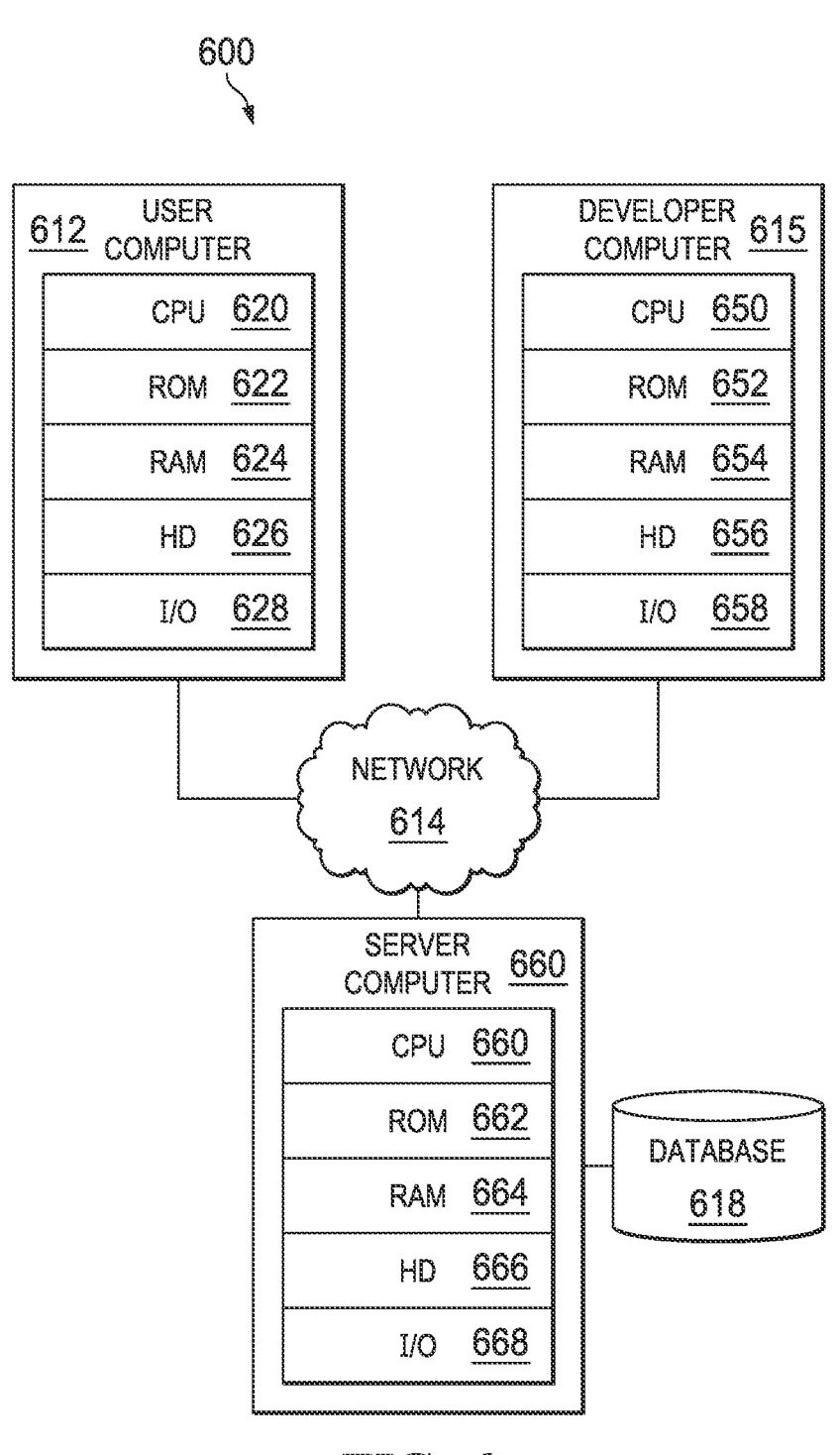
FIG. 6 depicts a diagrammatic representation of a distributed network computing environment where embodiments disclosed can be implemented.

FIG. 6 depicts a diagrammatic representation of a distributed network computing environment where embodiments disclosed can be implemented. In the example of HG. 6, network computing environment 600 may include network 614 that can be bi-directionally coupled to customer user computer 612, service developer (e.g., workload creator) computer 615, and server computer 616. Server computer 616 can be bi-directionally coupled to database 618 (e.g., an implementation of data store 550). Network 614 may represent a combination of wired and wireless networks that network computing environment 600 may utilize for various types of network communications known to those skilled in the art.

For the purpose of illustration, a single system is shown for each of customer user computer 612, service developer computer 615, and server computer 616. However, within each of customer user computer 612, service developer computer 615, and server computer 616, a plurality of computers (not shown) may be interconnected to each other over network 614. For example, a plurality of customer user computers 612 and a plurality of service developer computers 615 may be coupled to network 614. Customer user computers 612 may include data processing systems for communicating with server computer 616. Service developer computers 615 may include data processing systems for individuals whose jobs may require them to configure services used by customer user computers 612 in network computing environment 600.

Customer user computer 612 can include central processing unit ("CPU") 620, read-only memory ("ROM") 622, random access memory CRAM") 624, hard drive ("HD") or storage memory 626, and input/output device(s) ("I/O") 628. I/O 629 can include a keyboard, monitor, printer, electronic pointing device (e.g., mouse, trackball, stylus, etc.), or the like. Customer user computer 612 can include a desktop computer, a laptop computer, a personal digital assistant, a cellular phone, or nearly any device capable of communicating over a network. Service developer computer 615 may be similar to customer user computer 612 and can comprise CPU 650, ROM 652, RAM 654, HD 656, and I/O 658.

Likewise, server computer 616 may include CPU 660, ROM 662, RAM 664, HD 666, and I/O 668. Server computer 616 may include one or more backend systems configured for providing a variety of services to customer user computers 612 over network 614. One example of such a backend system can be a database management system for database 618. Many other alternative configurations are possible and known to skilled artisans.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 612, 615, and 616 is an example of a data processing system. ROM 622, 652, and 662; RAM 624, 654, and 664; HD 626, 656, and 666; and database 618 can include media that can be read by CPU 620, 650, or 660. Therefore, these types of memories include non-transitory computer-readable storage media. These memories may be internal or external to computers 612, 615, or 616.

Portions of the methods described herein may be implemented in suitable software code that may reside within ROM 622, 652, or 662; RAM 624, 654, or 664; or HD 626, 656, or 666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method for cross-jurisdictional workload control enforcement, the method comprising:

at design time, presenting, by a workload design application, a workload design interface that prompts a workload creator for input regarding a plurality of target locations and corresponding local controls;

determining whether the local controls are available as a condition to allow the workload creator to create a workload;

receiving, by the workload design application via the workload design interface, input indicating whether to turn on or off the local controls for individual ones of the target locations;

monitoring actions of the workload creator and applying local controls for individual ones of the target locations that are turned on to identify tasks that the workload creator attempts to add to the workload that involve cross-jurisdictional movement of data;

blocking an identified task from being added to the workload based on the controls;

creating the workload including tasks that have not been blocked;

unblocking the identified task in response to overriding the local controls; and adding the identified task to the workload.

2. The method of claim 1, further comprising, in response to identifying a first task which the workload creator attempts to add to the workload which involves cross-jurisdictional movement of data, presenting a notification to the workload creator via the workload design interface.

3. The method of claim 2, further comprising receiving, by the workload design application via the workload design interface, input responsive to the notification which indicates an exception to one of the local controls that caused the notification, and enabling the first task to be added to the workload.

4. The method of claim 2, further comprising receiving, by the workload design application via the workload design interface, input responsive to the notification which indicates an approval to override one of the local controls that caused the notification, and enabling the first task to be added to the workload.

5. The method of claim 4, further comprising, in response to receiving the approval to override the one of the local controls that caused the notification, generating an audit record indicative of the approval.

6. The method of claim 1, further comprising presenting, by the workload design interface, information for each of the local controls, including information on one or more of: approvals; regulations; and audit requirements.

7. The method of claim 1, further comprising delivering the workload to an application, the application being adapted to enable an end user to execute the workload at runtime.

8. A system for cross-jurisdictional workload control enforcement, the system comprising:

a processor;

a non-transitory computer-readable medium; and stored instructions translatable by the processor for:

at design time, presenting, by a workload design application, a workload design interface that prompts a workload creator for input regarding a plurality of target locations and corresponding local controls;

determining whether the local controls are available as a condition to allow the workload creator to create a workload;

receiving, by the workload design application via the workload design interface, input indicating whether to turn on or off the local controls for individual ones of the target locations;

monitoring actions of the workload creator and applying local controls for individual ones of the target locations that are turned on to identify tasks that the workload creator attempts to add to the workload that involve cross-jurisdictional movement of data;

blocking an identified task from being added to the workload based on the local controls;

creating the workload including tasks that have not been blocked unblocking the identified task in response to overriding the local controls; and adding the identified task to the workload.

9. The system of claim 8, the stored instructions further translatable by the processor for, in response to identifying a first task which the workload creator attempts to add to the workload which involves cross-jurisdictional movement of data, presenting a notification to the workload creator via the workload design interface.

10. The system of claim 9, the stored instructions further translatable by the processor for receiving, by the workload design application via the workload design interface, input responsive to the notification which indicates an exception to one of the local controls that caused the notification, and enabling the first task to be added to the workload.

11. The system of claim 9, the stored instructions further translatable by the processor for receiving, by the workload design application via the workload design interface, input responsive to the notification which indicates an approval to override one of the local controls that caused the notification, and enabling the first task to be added to the workload.

12. The system of claim 11, the stored instructions further translatable by the processor for, in response to receiving the approval to override the one of the local controls that caused the notification, generating an audit record indicative of the approval.

13. The system of claim 8, the stored instructions further translatable by the processor for presenting, by the workload design interface, information for each of the local controls, including information on one or more of: approvals; regulations; and audit requirements.

14. The system of claim 8, the stored instructions further translatable by the processor for delivering the workload to an application, the application being adapted to enable an end user to execute the workload at runtime.

15. A computer program product for cross-jurisdictional workload control enforcement, the computer program product comprising a non-transitory computer-readable medium storing instructions translatable by a computer processor for:

at design time, presenting, by a workload design application, a workload design interface that prompts a workload creator for input regarding a plurality of target locations and corresponding local controls;

determining whether the local controls are available as a condition to allow the workload creator to create a workload;

receiving, by the workload design application via the workload design interface, input indicating whether to turn on or off the local controls for individual ones of the target locations;

monitoring actions of the workload creator and applying local controls for individual ones of the target locations that are turned on to identify tasks that the workload creator attempts to add to the workload that involve cross-jurisdictional movement of data;

blocking an identified task from being added to the workload based on the local controls;

creating the workload including tasks that have not been blocked unblocking the identified task in response to overriding the local controls; and adding the identified task to the workload.

16. The computer program product of claim 15, the instructions further translatable by the computer processor for, in response to identifying a first task which the workload creator attempts to add to the workload which involves cross-jurisdictional movement of data, presenting a notification to the workload creator via the workload design interface.

17. The computer program product of claim 16, the instructions further translatable by the computer processor for receiving, by the workload design application via the workload design interface, input responsive to the notification which indicates an exception to one of the local controls that caused the notification, and enabling the first task to be added to the workload.

18. The computer program product of claim 16, the instructions further translatable by the computer processor for receiving, by the workload design application via the workload design interface, input responsive to the notification which indicates an approval to override one of the local controls that caused the notification, and enabling the first task to be added to the workload.

19. The computer program product of claim 18, the instructions further translatable by the computer processor for, in response to receiving the approval to override the one of the local controls that caused the notification, generating an audit record indicative of the approval.

20. The computer program product of claim 15, the instructions further translatable by the computer processor for presenting, by the workload design interface, information for each of the local controls, including information on one or more of: approvals; regulations; and audit requirements.

\* \* \* \* \*